United States Patent [19]
Steiner

[11] Patent Number: 5,987,877
[45] Date of Patent: Nov. 23, 1999

[54] TURBOPROP ENGINE WITH AN AIR-OIL COOLER

[75] Inventor: Kurt Steiner, Rangsdorf, Germany

[73] Assignee: Bayerische Motoren Werke Aktiengesellschaft, Munich, Germany

[21] Appl. No.: 08/983,115

[22] PCT Filed: Jun. 18, 1996

[86] PCT No.: PCT/EP96/02634

§ 371 Date: Jul. 6, 1998

§ 102(e) Date: Jul. 6, 1998

[87] PCT Pub. No.: WO97/02985

PCT Pub. Date: Jan. 30, 1997

[30] Foreign Application Priority Data

Jul. 7, 1995 [DE] Germany .......................... 195 24 731

[51] Int. Cl.[6] .................................................. F02C 7/12
[52] U.S. Cl. .......................... 60/39.08; 60/39.83
[58] Field of Search ................ 60/39.07, 39.08, 60/39.83, 226.1, 736

[56] References Cited

U.S. PATENT DOCUMENTS

| 2,268,183 | 12/1941 | Bugatti . | |
|---|---|---|---|
| 2,593,541 | 4/1952 | Cowdrey et al. . | |
| 4,887,424 | 12/1989 | Geidel et al. | 60/39.08 |
| 4,999,994 | 3/1991 | Rud | 60/39.08 |

FOREIGN PATENT DOCUMENTS

| 0 283 578 | 9/1988 | European Pat. Off. . |
|---|---|---|
| 864010 | 4/1941 | France . |

*Primary Examiner*—Louis J. Casaregola
*Attorney, Agent, or Firm*—Evenson, McKeown, Edwards & Lenahan, P.L.L.C.

[57] ABSTRACT

A turboprop engine in the pod of which an air-oil cooler is disposed downstream of a cooling air inlet opening. The oil cooler exhaust air is discharged via an air duct with which a cooling air conveying device is associated. In this way it is ensured that there is always a sufficient cooling air flow and that this air flow, as a relatively cold air flow, can also cool other units in the engine pod before acting on the oil cooler.

20 Claims, 2 Drawing Sheets

TURBOPROP ENGINE WITH AN AIR-OIL COOLER

BACKGROUND AND SUMMARY OF THE INVENTION

The invention relates to a turboprop engine having an inlet opening provided in the engine cage for cooling air for the cage interior and for an air/liquid heat exchanger arranged in this interior, having a cooling air delivery device as well as having an air guiding duct which accommodates the liquid/air heat exchanger and carries away the heat exchanger exhaust air.

Such a turboprop engine is known from U.S. Pat. No. 2,593,541. In this case, the air flow provided for an air oil cooler arrives directly from an inlet opening in the engine cage at the air oil cooler. The oil cooler exhaust air is carried away by way of the turbine exhaust air duct, the corresponding introduction device of the cooling air flow into the turbine exhaust air duct being constructed in the form of an ejector so that a cooling air delivery device is provided in the shape of this ejector. Such a cooling air delivery device is useful for those operations of the turboprop engine in which an aircraft equipped with this engine rolls along on the ground, particularly if a rolling along in the reverse direction takes place.

Another turboprop engine having a liquid-air heat exchanger, particularly an air oil cooler, is illustrated in European Patent Document EP 0 514 119 A1. Here, the air oil cooler is arranged in the area of the inlet opening so that the cooling of the cage interior takes place by means of the oil cooler exhaust air flow. In this case, the oil cooler exhaust air flows around the assemblies to be cooled which are arranged in the engine cage and is then also carried off by way of the turbine exhaust air duct, again the corresponding introduction device of the cooling air flow into the turbine exhaust air duct being constructed in the shape of an ejector.

At high exterior temperatures, for example, the oil cooler exhaust air flow can assume such high temperatures that the assemblies arranged in the engine cage which are acted upon by this air flow may be damaged.

It is an object of the invention to indicate measures by which an assembly arranged in the engine cage can be reliably cooled and in the process a sufficiently intensive air flow is guided through the liquid/air heat exchanger.

The achieving of this object is characterized in that the cooling air inlet opening is adjoined by an air guiding duct which is directed to at least one assembly to be cooled, and in that the cooling air delivery device is constructed as a fan which is disposed in front of the heat exchanger and is arranged in the air guiding duct.

In that the heat exchanger or oil cooler is arranged away from the inlet opening and a cooling air delivery device is provided which is constructed as a fan, the cooling air flow arriving through the inlet opening in the cage interior can first optimally act upon the assemblies to be cooled and will only then arrive on the oil cooler. From this oil cooler, this then heated air flow is carried away as the oil cooler exhaust air flow in a targeted manner, specifically by way of an air guiding duct so that any heating of the cage interior by the oil cooler exhaust air is virtually excluded.

In order to, in the process, guide the cooling air flow, which arrives in the engine cage by way of the inlet opening and which, because of the fan, is definitely of a sufficient intensity, in a targeted manner to the assemblies to be cooled, the air inlet opening is adjoined by an appropriately designed air guiding duct. In this air guiding duct or generally at the cooling air inlet opening, a separating device for water and/or particles, which may damage the cage interior, may also be provided.

The cooling air delivery device constructed as a fan can be driven by an electric motor, which has the advantage that, in a simple manner, only at a few operating points, specifically when a separate cooling air delivery is required at all, the required fan power must be provided. Since, however, a corresponding electric motor also results in an increased weight, the fan can also be driven mechanically by way of the so-called gear box, that is, by way of the transmission arrangement for the auxiliary unit drive of the flight gas turbine known to the person skilled in the art. Here, it is recommended to arrange a shifting coupling between the fan as well as the corresponding gear box output shaft in order to again only have to drive the fan if the delivery of a cooling air flow is required.

Other objects, advantages and novel features of the present invention will become apparent from the following detailed description of the invention when considered in conjunction with the accompanying drawings.

DETAILED DESCRIPTION OF THE DRAWINGS

Figure 1:
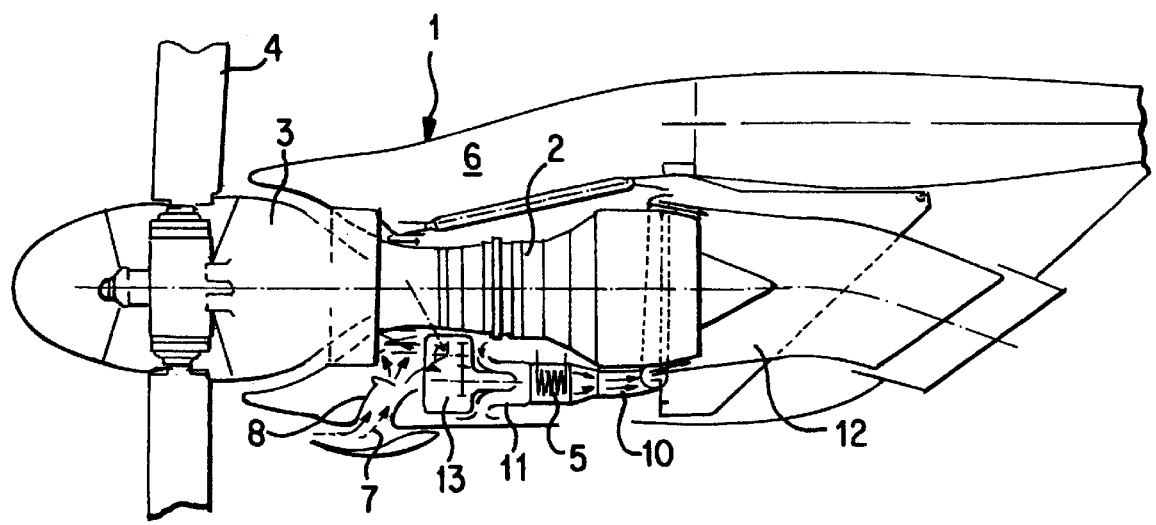
FIG. 1 is a schematic longitudinal sectional view of a turboprop engine according to a preferred embodiment of the present invention.
Figure 2:
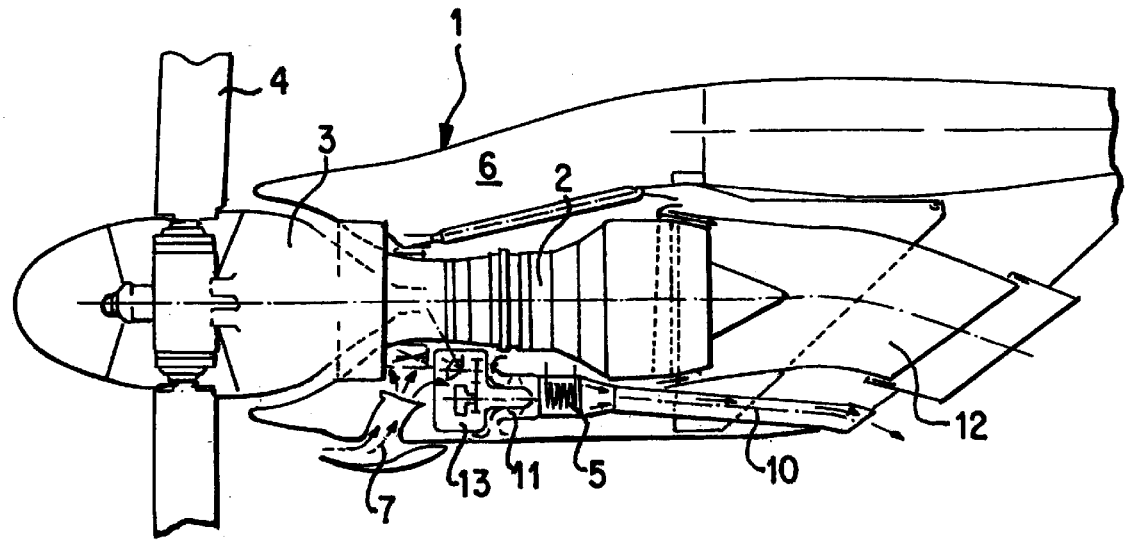
FIG. 2 is a schematic longitudinal sectional view of a turboprop engine according to another preferred embodiment of the present invention.
Figure 3:
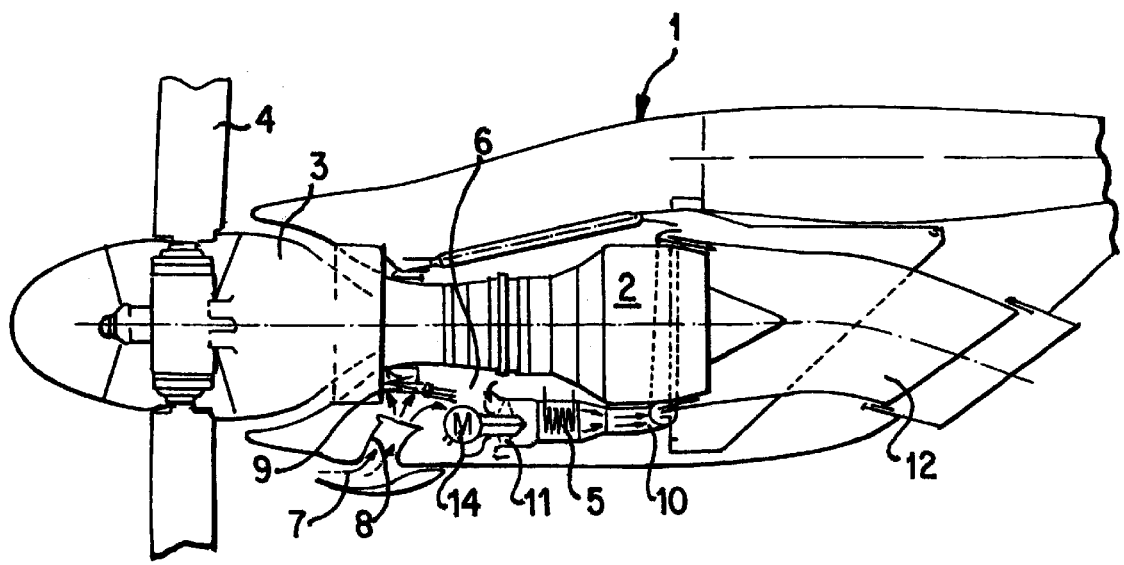
FIG. 3 is a schematic longitudinal sectional view of a turboprop engine according to another preferred embodiment of the present invention.

Referring to FIGS. 1–3, identical structural elements have the same reference numbers.

A gas turbine arranged in the engine cage 1 has the reference number 2. By way of a transmission 3, this gas turbine 2 drives a propeller 4. Since a relatively high power is transmitted in the transmission 3, a cooling of the transmission oil is required. For this purpose, an oil cooler 5 is arranged in the cage interior 6.

The oil cooler 5 or generally the air/fluid heat exchanger 5 receives the required cooling air by way of a cooling air inlet opening 7 which is provided in the engine cage 1 and can be optimally constructed under fluidic aspects, for example, as illustrated in the shape of a guide blade which partially siphons off the air flow arriving on it. This inlet opening 7 is adjoined by an air guiding duct 8 by way of which the siphoned-off cooling air flow is supplied to the assemblies to be cooled which are arranged in the engine cage 1 and are not shown in detail and generally have the reference number 9.

After the cooling air flow has swept over the assemblies 9, it arrives at the oil cooler 5 and from it, as an exhaust air flow—as illustrated by arrows—by way of an air guiding duct 10 reaches the environment. In this case, the described guiding of the cooling air flow is provided by a cooling air delivery device which in general has the reference number 11 and which is assigned to the air guiding duct 10 which—in the widest sense—accommodates the oil cooler 5.

In the embodiments according to FIGS. 1, 2, the fan or the cooling air delivery device 11 is driven by means of a shifting coupling, which is not shown, by the gear box 13 assigned to the gas turbine 2 and arranged in the cage interior 6, specifically by way of an output shaft of the gear box 13.

In the embodiment according to FIG. 3, the fan or the cooling air delivery device 11 is driven by way of an electric motor 14.

In the embodiments according to FIGS. 1, 3, the air guiding duct 10 carrying away the heat exchanger exhaust air leads into the turbine exhaust air duct 12, while in the embodiment according to FIG. 2, the air guiding duct 10 for the oil cooler exhaust air leads directly into the environment so that no undesirable influencing of the flow conditions takes place here in the turbine exhaust air duct 12.

All embodiments have in common that the cooling air flow arriving in the cage interior 6 by way of the inlet opening 7 is first guided over the assemblies 9 to be cooled and will only then reach the oil cooler 5 arranged away from the inlet opening 7. From this oil cooler 5, the air flow, as oil cooler exhaust air, is then in all embodiments carried off by way of the air guiding duct 10 into the environment without any noticeable heating of the cage interior 6 taking place. In this case, the cooling air flow is always delivered by a delivery device 11 assigned to the air guiding duct 10. Naturally, a plurality of details, particularly of a constructive type, may be designed to deviate from the illustrated embodiments without leaving the content of the claims.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A turboprop engine, comprising:
    an engine casing defining an interior and defining an cooling air inlet opening into said interior for cooling air;
    a cooling air guiding duct adjoining said inlet opening, said cooling air guiding duct being directed to at least one assembly to be cooled;
    an air-liquid heat exchanger arranged in said interior;
    a cooling air delivery device arranged adjacent and upstream of said heat exchanger and downstream of said at least one assembly to be cooled; and
    an exhaust air guiding duct arranged adjacent and downstream of said heat exchanger.

2. A turboprop engine according to claim 1, wherein the cooling air delivery device is a fan.

3. A turboprop engine according to claim 2, wherein the fan is driven by one of an electric motor and a shifting coupling of a transmission arrangement for an auxiliary unit drive.

4. A turboprop engine according to claim 1, wherein said exhaust air guiding duct is communicated with an exhaust duct of a gas turbine.

5. A turboprop engine according to claim 1, wherein said exhaust air guiding duct is communicated with an ambient environment.

6. A turboprop engine according to claim 1, wherein the cooling air delivery device is driven by an electric motor.

7. A turboprop engine according to claim 1, wherein the cooling air delivery device is driven by a shifting coupling of a transmission arrangement for an auxiliary unit drive.

8. A turboprop engine according to claim 1, wherein said heat exchanger is arranged rearward of said cooling air guiding duct.

9. A turboprop engine according to claim 1, wherein said exhaust air guiding duct is arranged rearward of said heat exchanger.

10. A turboprop engine according to claim 8, wherein said exhaust air guiding duct is arranged rearward of said heat exchanger.

11. A turboprop engine, comprising:
    an engine casing defining an interior;
    an assembly to be cooled arranged in said interior;
    a cooling air guiding duct communicating said interior with an ambient atmosphere, said cooling air guiding duct having an outlet arranged proximate said assembly to be cooled such that said cooling air guiding duct directs cooling air to said assembly to be cooled;
    an air-liquid heat exchanger arranged in said interior downstream of said assembly to be cooled;
    a cooling air delivery device arranged adjacent and upstream of said heat exchanger and downstream of said at least one assembly to be cooled; and
    an exhaust air guiding duct arranged adjacent and downstream of said heat exchanger.

12. A turboprop engine according to claim 11, wherein the cooling air delivery device is a fan.

13. A turboprop engine according to claim 12, wherein the fan is driven by one of an electric motor and a shifting coupling of a transmission arrangement for an auxiliary unit drive.

14. A turboprop engine according to claim 11, wherein said exhaust air guiding duct is communicated with an exhaust duct of a gas turbine.

15. A turboprop engine according to claim 11, wherein said exhaust air guiding duct is communicated with an ambient environment.

16. A turboprop engine according to claim 11, wherein the cooling air delivery device is driven by an electric motor.

17. A turboprop engine according to claim 11, wherein the cooling air delivery device is driven by a shifting coupling of a transmission arrangement for an auxiliary unit drive.

18. A turboprop engine according to claim 11, wherein said heat exchanger is arranged rearward of said cooling air guiding duct.

19. A turboprop engine according to claim 11, wherein said exhaust air guiding duct is arranged rearward of said heat exchanger.

20. A turboprop engine according to claim 18, wherein said exhaust air guiding duct is arranged rearward of said heat exchanger.

* * * * *